May 13, 1930.  J. BARTIK  1,758,213
ELECTRICAL HEATING APPARATUS
Filed May 26, 1928

INVENTOR:
Josef Bartik
BY: Ruegg, Bayer & Bachelor
ATTORNEYS.

Patented May 13, 1930

1,758,213

UNITED STATES PATENT OFFICE

JOSEF BARTIK, OF VIENNA, AUSTRIA

ELECTRICAL HEATING APPARATUS

Application filed May 26, 1928, Serial No. 280,702, and in Austria May 31, 1927.

The invention relates to improvements in electric heating-apparatus, the heating-coil of which is embedded in a di-electrical material.

The object of the invention is to make such heating-apparatus practicable as a warming-cushion. For this purpose the casing of the apparatus containing the heating-coil embedded in sand or the like consists of a flexible material.

The invention is illustrated by the accompanying drawing, in which

Figure 1:
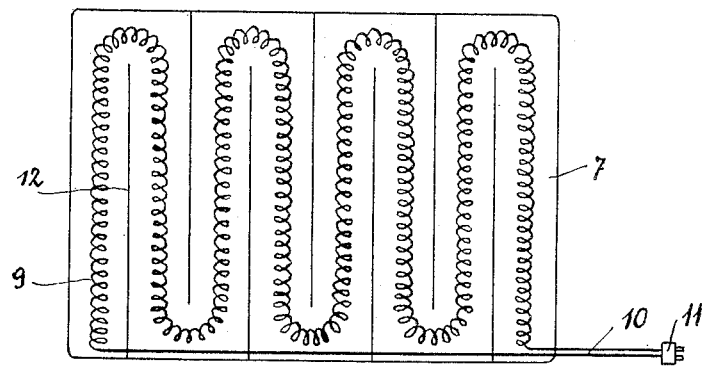
Figure 2:
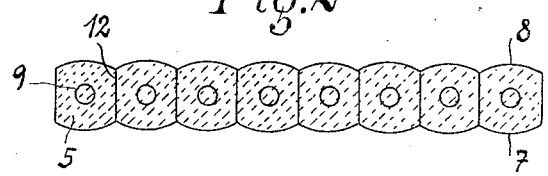

Figs. 1 and 2 show a top view and a vertical section respectively of an apparatus embodying the present invention.

The warming-cushion consists of two pieces 7, 8, of a fabric, which are united at their edges and enclose a filler 5 which may be sand. A heating-coil is embedded in this filler and is connected to a contact 11 by insulated conducting-wires 10. It is desirable to make the cushion sufficiently flexible, which condition enables the cushion to conform closely to bodies of any shape. For ensuring this the casing 7, 8 should not be tightly filled. In order to ensure the uniform distribution of the filler and that the heating-coil is always enveloped by the same, there are arranged partitions 12, which divide the interior of the casing into several compartments, the partitions being foreshortened alternately at opposite ends whereby the compartments resemble a zigzag shaped pipe.

The purpose of the filler is not only to serve as a bed for the heating-coil, but it operates as a heat-accumulator and assist in transmitting the heat to the desired parts of the user's body. Instead of sand there may be used another di-electric material such as dry earth, marshy soil and so on.

What I claim is:

1. An electrical heating device, comprising a container of pliable material, a filler of granular, electrically non-conductive material in said container, the quantity of filler being insufficient to tightly fill the container, and an electric heating unit embedded within said filler.

2. An electrical heating device, comprising a container of pliable material, a plurality of partitions within said container, the successive partitions being foreshortened at alternately opposite ends thereby to divide the container into successively communicating compartments, a filler of granular electrically non-conductive material in each of said compartments, and an electric heating unit embedded within said filler and traversing all of said compartments.

In testimony whereof I have signed my name to this specification.

JOSEF BARTIK.